April 29, 1941. W. H. FRANK 2,240,180
CONTINUOUS OUTLET SYSTEM
Original Filed Jan. 3, 1938   2 Sheets-Sheet 1

INVENTOR.
William H. Frank
BY Daniel G. Cullen
ATTORNEY.

April 29, 1941.　　　W. H. FRANK　　　2,240,180
CONTINUOUS OUTLET SYSTEM
Original Filed Jan. 3, 1938　　2 Sheets-Sheet 2
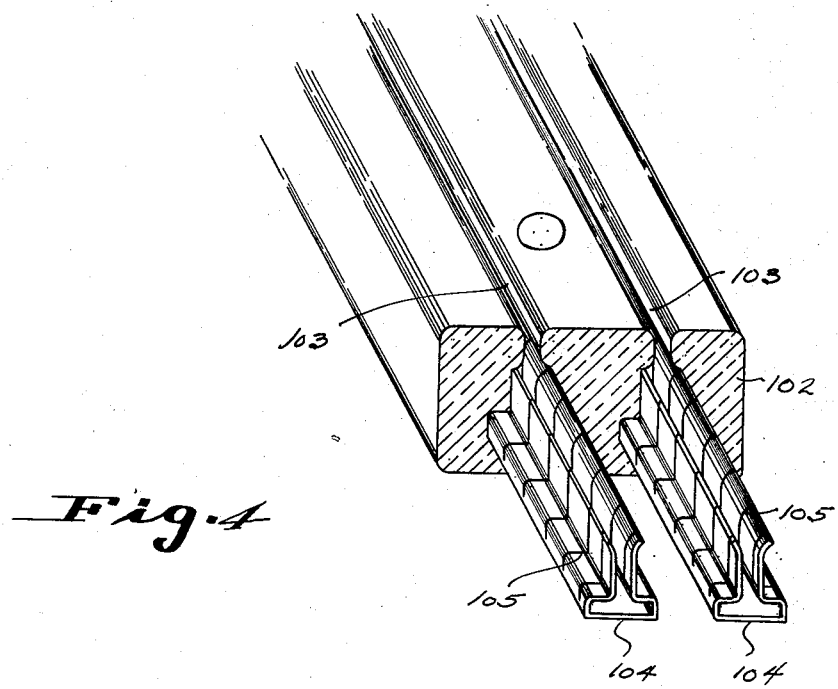
Fig. 4
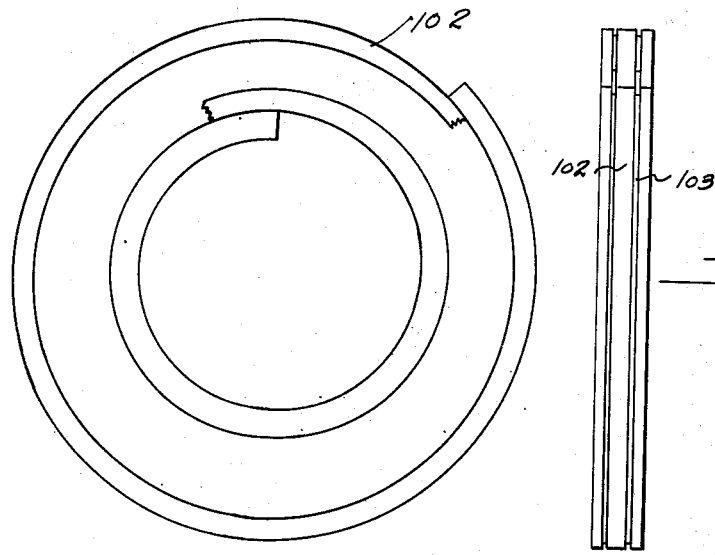
Fig. 5
Fig. 6
INVENTOR.
William H. Frank
BY
Daniel G. Cullen
ATTORNEY.

Patented Apr. 29, 1941

2,240,180

UNITED STATES PATENT OFFICE 2,240,180

CONTINUOUS OUTLET SYSTEM

William H. Frank, Detroit, Mich.

Continuation of application Serial No. 183,232, January 3, 1938. This application February 14, 1940, Serial No. 318,920

8 Claims. (Cl. 173—334.1)

This application relates to continuous outlet systems for electrical distribution and discloses particularly a continuous outlet having exposed grooves for receiving prongs of standard attachment caps, with these prongs engaging, through the grooves, bus bars within the duct.

This application is a continuation of a prior application, Serial No. 183,232, filed January 3, 1938, now abandoned.

For an understanding of the continuous outlet herein disclosed, reference should be had to the appended drawings. In these drawings, Fig. 1 is an end view of a fragment of a continuous outlet employing a thick rubber strip encompassing bus bars and useful for receiving standard attachment plugs;

Fig. 4 is another view of the outlet of Fig. 1;

Fig. 5 shows how the outlet of Fig. 1 may be coiled with the slotted side out;

Fig. 6 is an end view of the coil of Fig. 5.

Figure 1:
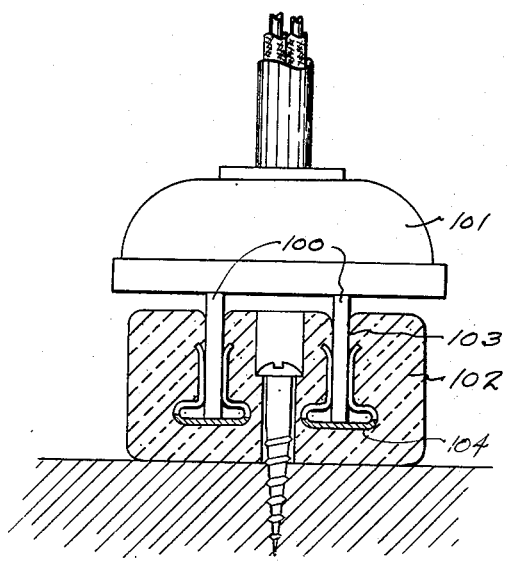

Figs. 1–6 show a continuous outlet having two continuous grooves exposing bus bars formed for receiving prongs 100 of standard attachment caps 101. The outlet may be formed of a doubly grooved strip 102 of flexible material, such as rubber, with the grooves 103 receiving the prongs, each groove containing a bus bar 104 of cross section adapted to form a continuous prong receiving contact. For permitting bending and coiling of the outlet the sides of the bus bars 104 may be transversely slitted on shear lines 105 which start at the bights of the bus bars and terminate at the free edges of the bus bars. Because of the provision of these slits 105 and because of the flexibility of the material employed for the strip 102, it is practical to form long lengths of outlet and to coil such lengths with the grooves 103 on the outside of the coil. In such coiling slits 105 of the bus bars may open up to relieve the tension created in the bus bars by such coiling.

Figure 3:
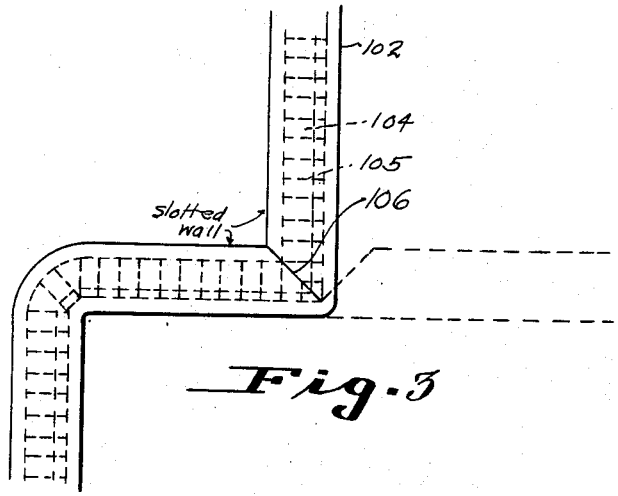
Fig. 3 shows how bends may be formed.

This characteristic may also be used to advantage in the formation of outside bends such as that shown in the lower left corner of Fig. 3 which shows a bend with the grooves of the outlet outside.

Figure 2:
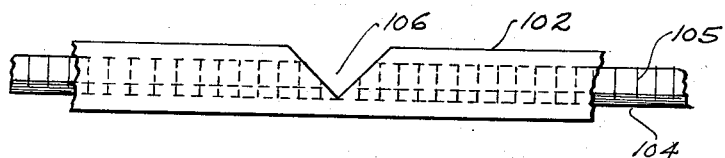
Fig. 2 shows how a miter cut may be formed in the outlet for bending.

For forming an inside bend, that is with the grooves of the outlet inside, the expedient illustrated in Figs. 2 and 3 may be employed. Fig. 2 shows how a miter cut 106 in the outlet may be made, with the cut including not only the strip 102 but also parts of the bus bars 104. The cut will extend only to the bights of the bus bars, leaving such bights and the wall mounting side of the strip uncut and continuous. When a cut of this character is formed in a duct, the duct may be bent sharply, as shown in Fig. 3 at the right hand side, to form a sharp inside bend with both the strip and the bus bars being continuous, electrically and mechanically, and with no live parts being exposed for accidental contact.

The bus bars may be assembled with the outlet strip in any suitable manner. For example, the strip may be extruded around the bus bars; or the bus bars may be inserted into a previously molded outlet strip, which itself may be made by extrusion.

I claim:

1. A continuous outlet of strip form comprising a strip of flexible material, such as rubber, having two parallel longitudinal continuous grooves on its top surface, with each groove being of inverted T cross section, the leg of the T opening to the top surface and the base of the T extending parallel to the top surface, each groove containing a strip bus bar of sheet metal folded in a double walled T to provide a base and two sides which are parallel and close together to form a prong receiving continuous contact, the base of each strip being of greater transverse dimensions than the space between the sides, the walls of each groove closely fitting against the outer surface of each strip so that the latter acts as a liner for each strip.

2. A continuous outlet of strip form comprising a strip of flexible material, such as rubber, having two parallel longitudinal continuous grooves on its top surface, with each groove being of inverted T cross section, the leg of the T opening to the top surface and the base of the T extending parallel to the top surface, each groove containing a strip bus bar of sheet metal folded in a double walled T to provide a base and two sides which are parallel and close together to form a prong receiving continuous contact, the base of each strip being of greater transverse dimensions than the space between the sides, the walls of each groove closely fitting against the outer surface of each strip so that the latter acts as a liner for each strip, the spacing between the sides corresponding to the thickness of conventional attachment plug prongs.

3. A continuous outlet of strip form comprising a strip of flexible material, such as rubber, having two parallel longitudinal continuous grooves on its top surface, with each groove being of inverted T cross section, the leg of the T opening to the top surface and the base of the T extending parallel to the top surface, each groove containing a strip bus bar of sheet metal folded in a double walled T to provide a base and two sides which are parallel and close together to form a prong receiving continuous contact, the base of each strip being of greater transverse dimensions than the space between the sides, the walls of each groove closely fitting against the outer surface of each strip so that the latter acts as a liner for each strip, the spacing between the grooves corresponding to the spacing between conventional attachment plug prongs.

4. A continuous outlet of strip form comprising a strip of flexible material, such as rubber, having two parallel longitudinal continuous grooves on its top surface, with each groove being of inverted T cross section, the leg of the T opening to the top surface and the base of the T extending parallel to the top surface, each groove containing a strip bus bar of sheet metal folded in a double walled T to provide a base and two sides which are parallel and close together to form a prong receiving continuous contact, the base of each strip being of greater transverse dimensions than the space between the sides, the walls of each groove closely fitting against the outer surface of each strip so that the latter acts as a liner for each strip, the spacing between the sides corresponding to the thickness of conventional attachment plug prongs, the spacing between the grooves corresponding to the spacing between conventional attachment plug prongs.

5. A continuous outlet of strip form comprising a strip of flexible material, such as rubber, having two parallel longitudinal continuous grooves on its top surface, with each groove being of inverted T cross section, the leg of the T opening to the top surface and the base of the T extending parallel to the top surface, each groove containing a strip bus bar of sheet metal folded in a double walled T to provide a base and two sides which are parallel and close together to form a prong receiving continuous contact, the base of each strip being of greater transverse dimensions than the space between the sides, the walls of each groove closely fitting against the outer surface of each strip so that the latter acts as a liner for each strip, the sides of the strips being transversely slitted at closely spaced intervals, with the slits extending from the free edges of the sides close to the bases of the strips, these bases being not slitted.

6. A continuous outlet of strip form comprising a strip of flexible material, such as rubber, having two parallel longitudinal continuous grooves on its top surface, with each groove being of inverted T cross section, the leg of the T opening to the top surface and the base of the T extending parallel to the top surface, each groove containing a strip bus bar of sheet metal folded in a double walled T to provide a base and two sides which are parallel and close together to form a prong receiving continuous contact, the base of each strip being of greater transverse dimensions than the space between the sides, the walls of each groove closely fitting against the outer surface of each strip so that the latter acts as a liner for each strip, the spacing between the sides corresponding to the thickness of conventional attachment plug prongs, the sides of the strips being transversely slitted at closely spaced intervals, with the slits extending from the free edges of the sides close to the bases of the strips, these bases being not slitted.

7. A continuous outlet of strip form comprising a strip of flexible material, such as rubber, having two parallel longitudinal continuous grooves on its top surface, with each groove being of inverted T cross section, the leg of the T opening to the top surface and the base of the T extending parallel to the top surface, each groove containing a strip bus bar of sheet metal folded in a double walled T to provide a base and two sides which are parallel and close together to form a prong receiving continuous contact, the base of each strip being of greater transverse dimensions than the space between the sides, the walls of each groove closely fitting against the outer surface of each strip so that the latter acts as a liner for each strip, the spacing between the grooves corresponding to the spacing between conventional attachment plug prongs, the sides of the strips being transversely slitted at closely spaced intervals, with the slits extending from the free edges of the sides close to the bases of the strips, these bases being not slitted.

8. A continuous outlet of strip form comprising a strip of flexible material, such as rubber, having two parallel longitudinal continuous grooves on its top surface, with each groove being of inverted T cross section, the leg of the T opening to the top surface and the base of the T extending parallel to the top surface, each groove containing a strip of bus bar of sheet metal folded in a double walled T to provide a base and two sides which are parallel and close together to form a prong receiving continuous contact, the base of each strip being of greater transverse dimensions than the space between the sides, the walls of each groove closely fitting against the outer surface of each strip so that the latter acts as a liner for each strip, the spacing between sides corresponding to the thickness of conventional attachment plug prongs, the spacing between the grooves corresponding to the spacing between conventional attachment plug prongs, the sides of the strips being transversely slitted at closely spaced intervals, with the slits extending from the free edges of the sides close to the bases of the strips, these bases being not slitted.

WILLIAM H. FRANK.